US012662186B2

(12) United States Patent
Tsubaki et al.

(10) Patent No.: US 12,662,186 B2
(45) Date of Patent: Jun. 23, 2026

(54) CONTROL DEVICE OF VEHICLE STEERING SYSTEM

(71) Applicant: NSK STEERING & CONTROL, INC., Tokyo (JP)

(72) Inventors: Takahiro Tsubaki, Gunma (JP); Ryo Minaki, Kanagawa (JP); Takaaki Uemoto, Tokyo (JP)

(73) Assignee: NSK STEERING & CONTROL, INC., Tokyo (JP)

( * ) Notice: Subject to any disclaimer, the term of this patent is extended or adjusted under 35 U.S.C. 154(b) by 63 days.

(21) Appl. No.: 18/861,822

(22) PCT Filed: Dec. 21, 2022

(86) PCT No.: PCT/JP2022/047143
§ 371 (c)(1),
(2) Date: Oct. 30, 2024

(87) PCT Pub. No.: WO2023/228455
PCT Pub. Date: Nov. 30, 2023

(65) Prior Publication Data
US 2025/0304152 A1 Oct. 2, 2025

(30) Foreign Application Priority Data
May 23, 2022 (JP) ................................ 2022-084001

(51) Int. Cl.
*B62D 6/00* (2006.01)
*B62D 5/04* (2006.01)

(52) U.S. Cl.
CPC .............. *B62D 6/00* (2013.01); *B62D 5/046* (2013.01)

(58) Field of Classification Search
CPC . B62D 6/00; B62D 6/04; B62D 6/002; B62D 5/046

(Continued)

(56) References Cited

U.S. PATENT DOCUMENTS 11,338,844 B2 * 5/2022 Kezobo ................. B62D 6/008
11,820,443 B2 * 11/2023 Kim ..................... B62D 15/025
(Continued)

FOREIGN PATENT DOCUMENTS

JP 2002-337711 A 11/2002
JP 2006-111099 A 4/2006
(Continued)

OTHER PUBLICATIONS

International Search Report issued in International Application No. PCT/JP2022/047143, mailed Mar. 7, 2023.
(Continued)

*Primary Examiner* — Hai H Huynh
(74) *Attorney, Agent, or Firm* — Sughrue Mion, PLLC

(57) ABSTRACT

According to an aspect, a control device of a vehicle steering system includes a turning motor that turns a turning wheel in accordance with a steering angle of a steering wheel and a turning angle controller configured to generate, based on a turning angle target value, a motor current command value of current to be supplied to the turning motor. The turning angle controller includes: a feedforward compensator configured to improve followability of the turning angle with respect to the turning angle target value; a feedback compensator configured to control the motor current command value based on a deviation between an output value of the feedforward compensator and an actual turning angle of the turning wheel; and a disturbance observer configured to estimate a disturbance component acting on an inertial system including the turning motor and to remove the disturbance component from the motor current command value.

9 Claims, 10 Drawing Sheets

(58) Field of Classification Search
     USPC ......................................... 701/41, 42, 43, 44
     See application file for complete search history.

(56)                          References Cited

U.S. PATENT DOCUMENTS

2006/0080016 A1      4/2006  Kasahara et al.
2019/0084613 A1*     3/2019  Tsubaki .............. B62D 15/025
2020/0290669 A1      9/2020  Okano et al.
2022/0135117 A1      5/2022  Tsubaki

FOREIGN PATENT DOCUMENTS

JP         2007-237937  A      9/2007
JP         2020-175770  A     10/2020
JP         2020-189531  A     11/2020
JP         2020-203499  A     12/2020

OTHER PUBLICATIONS

Extended European Search Report dated May 8, 2026 in Application No. 22943854.4.

* cited by examiner

FIG.5

CONTROL DEVICE OF VEHICLE STEERING SYSTEM

CROSS-REFERENCE TO RELATED APPLICATION

This application is a National Stage of PCT international application Ser. No. PCT/JP2022/047143 filed on Dec. 21, 2022 which designates the United States, incorporated herein by reference, and which is based upon and claims the benefit of priority from Japanese Patent Application No. 2022-084001 filed on May 23, 2022, the entire contents of which are incorporated herein by reference.

FIELD

The present disclosure relates to a control device of a vehicle steering system.

BACKGROUND

As one of vehicle steering systems, there is a steer by wire (SBW) system in which a steering mechanism (FFA: Force Feedback Actuator) having a steering wheel operated by a driver and a turning mechanism (RWA: Road Wheel Actuator) for turning a turning wheel are mechanically separated from each other. In the SBW system, the steering mechanism and the turning mechanism are electrically connected to each other via a control device (ECU: Electronic Control Unit), an operation of the steering wheel is transmitted to the turning mechanism by an electrical signal to turn the turning wheel, and steering reaction force for giving an appropriate steering feeling to a driver is generated by the steering mechanism. The steering mechanism generates the steering reaction force by a reaction force actuator including a reaction force motor, and the turning mechanism turns the turning wheel by a turning actuator including a turning motor. The reaction force actuator and the steering wheel are mechanically connected to each other via a column shaft, and reaction force (torque) generated by the reaction force actuator is transmitted to the driver via the column shaft and the steering wheel.

In the SBW system in which the steering mechanism and the turning mechanism are mechanically separated from each other, it is necessary to prevent or reduce a deviation of a turning angle caused by disturbance from a road surface. Patent Literature 1 below discloses a configuration in which torque affecting a pinion angle is estimated as disturbance torque and is converted into torque applied to a steering shaft.

CITATION LIST

Patent Literature

Patent Literature 1: JP 2020-203499 A

TECHNICAL PROBLEM

In the above-described conventional technique, a feedforward operation amount is calculated by multiplying a second order time differential value of a pinion angle command value by an inertia coefficient. In general, since the inertia coefficient is a constant value, feedforward control is not appropriately performed depending on the frequency, and there is a possibility that an appropriate input/output transmission characteristic cannot be set.

For the foregoing reasons, there is a need for a control device of a vehicle steering system capable of providing a desired input/output transmission characteristic while preventing or reducing a deviation of a turning angle that would be caused by disturbance from a road surface.

SUMMARY

A control device of a vehicle steering system according to an aspect of the present invention includes a turning motor that turns a turning wheel in accordance with a steering angle of a steering wheel. The control device includes a turning angle controller configured to generate, based on a turning angle target value serving as a target value of a turning angle of the turning wheel, a motor current command value serving as a control target value of current to be supplied to the turning motor. The turning angle controller includes: a feedforward compensator configured to improve followability of the turning angle with respect to the turning angle target value; a feedback compensator configured to control the motor current command value based on a deviation between an output value of the feedforward compensator and an actual turning angle serving as an actual turning angle of the turning wheel; and a disturbance observer configured to estimate a disturbance component acting on an inertial system including the turning motor and to remove the disturbance component from the motor current command value.

According to the above-described configuration, the deviation of the turning angle that would be caused by the disturbance from the road surface can be prevented or reduced by a disturbance observer. In addition, a desired input/output transmission characteristic can be provided by a feedforward compensator.

As a desirable aspect of the control device of the vehicle steering system, when Gm denotes a target transmission characteristic of a control system that receives the turning angle target value and outputs the actual turning angle, and Gref denotes a transmission characteristic of a control system that receives the output value of the feedforward compensator and outputs the actual turning angle, the feedforward compensator is preferably configured to output a value obtained by applying a transmission characteristic Gm/Gref to the turning angle target value.

According to the above configuration, the transmission characteristic of the feedforward compensator can be set using a target transmission characteristic Gm to be provided in a turning angle controller and a transmission characteristic Gref that can be derived by simulation. As a result, followability to the target transmission characteristic Gm provided by the turning angle controller can be improved.

As a desirable aspect of the control device of the vehicle steering system, when Gm denotes a target transmission characteristic of a control system that receives the turning angle target value and outputs the actual turning angle, Gref denotes a transmission characteristic of a control system that receives the output value of the feedforward compensator and outputs the actual turning angle, and P denotes a transmission characteristic of a control system that receives an output value of the feedback compensator and outputs the actual turning angle, the feedforward compensator is configured to output a first value obtained by applying the target transmission characteristic Gm to the turning angle target value and output a second value obtained by applying a transmission characteristic Gm/P to the turning angle target value, the feedback compensator is configured to control the motor current command value based on a deviation between the first value and the actual turning angle, and the disturbance observer is preferably configured to control the motor current command value based on a value obtained by adding the second value to the output value of the feedback compensator.

According to the above configuration, the transmission characteristic of the feedforward compensator can be set using a target transmission characteristic Gm to be provided in a turning angle controller and a transmission characteristic P that can be derived by simulation. As a result, followability to the target transmission characteristic Gm provided by the turning angle controller can be improved.

As a desirable aspect of the control device of the vehicle steering system, the disturbance observer preferably includes a filter having a predetermined high frequency attenuation characteristic, generates an inverse model of the inertial system by applying the filter to an inverse characteristic of a plant model serving as a transmission characteristic of the inertial system, calculates a torque estimation value of the disturbance component by subtracting a value obtained by converting an output value of the disturbance observer into torque and further applying the filter from a value obtained by multiplying the actual turning angle by the inverse model, calculates a current estimation value of the disturbance component by converting the torque estimation value into current, and removes a value obtained by multiplying the current estimation value by a compensation gain from the output value of the feedback compensator and outputs a result value as the motor current command value.

According to the above-described configuration, the disturbance acting on the inertial system can be removed.

As a desirable aspect of the control device of the vehicle steering system, the disturbance observer preferably includes a filter having a predetermined high frequency attenuation characteristic, generates an inverse model of a plant model serving as a transmission characteristic of the inertial system, calculates a torque estimation value of the disturbance component by subtracting a value obtained by converting an output value of the disturbance observer into torque from a value obtained by multiplying the actual turning angle by the inverse model and further applying the filter, calculates a current estimation value of the disturbance component by converting the torque estimation value into a current, and removes a value obtained by multiplying the current estimation value by a compensation gain from the output value of the feedback compensator and outputs a result value as the motor current command value.

According to the above-described configuration, the disturbance acting on the inertial system can be removed.

As a desirable aspect of the control device of the vehicle steering system, the disturbance observer preferably includes a filter having a predetermined high frequency attenuation characteristic, generates an inverse model of the inertial system by converting an inverse characteristic of a plant model serving as a transmission characteristic of the inertial system into current and further applying the filter, calculates a current estimation value of the disturbance component by subtracting a value obtained by applying the filter to an output value of the disturbance observer from a value obtained by multiplying the actual turning angle by the inverse model, and removes a value obtained by multiplying the current estimation value by a compensation gain from the output value of the feedback compensator and outputs a result value as the motor current command value.

According to the above-described configuration, the disturbance acting on the inertial system can be removed.

As a desirable aspect of the control device of the vehicle steering system, the disturbance observer preferably includes a filter having a predetermined high frequency attenuation characteristic, generates an inverse model of the inertial system by converting an inverse characteristic of a plant model serving as a transmission characteristic of the inertial system into current, calculates a current estimation value of the disturbance component by subtracting an output value of the disturbance observer from a value obtained by multiplying the actual turning angle by the inverse model and further applying the filter, and removes a value obtained by multiplying the current estimation value by a compensation gain from the output value of the feedback compensator and outputs a result value as the motor current command value.

According to the above-described configuration, the disturbance acting on the inertial system can be removed.

As a desirable aspect of the control device of the vehicle steering system, the feedback compensator is preferably formed of a PID controller.

As a desirable aspect of the control device of the vehicle steering system, the feedback compensator is preferably formed of a PD controller.

Advantageous Effects of Invention

According to the aspects of the present invention, it is possible to provide a control device of a vehicle steering system capable of providing a desired input/output transmission characteristic while preventing or reducing a deviation of a turning angle that would be caused by disturbance from a road surface.

BRIEF DESCRIPTION OF DRAWINGS

FIG. 5 is a diagram illustrating an example of a block diagram including the turning angle controller and a control target.

FIG. 8 is a diagram illustrating an example of a block diagram in which FIG. 5 is simplified.

DESCRIPTION OF EMBODIMENTS

Hereinafter, modes for carrying out the aspects of the invention (hereinafter, referred to as an embodiment) will be described in detail with reference to the drawings. The present invention is not limited by the following embodiments. In addition, components in the following embodiments include those that can be easily assumed by those skilled in the art, those that are substantially the same, and those within a so-called equivalent range. Furthermore, the components disclosed in the following embodiments can be appropriately combined with each other.

Figure 1:
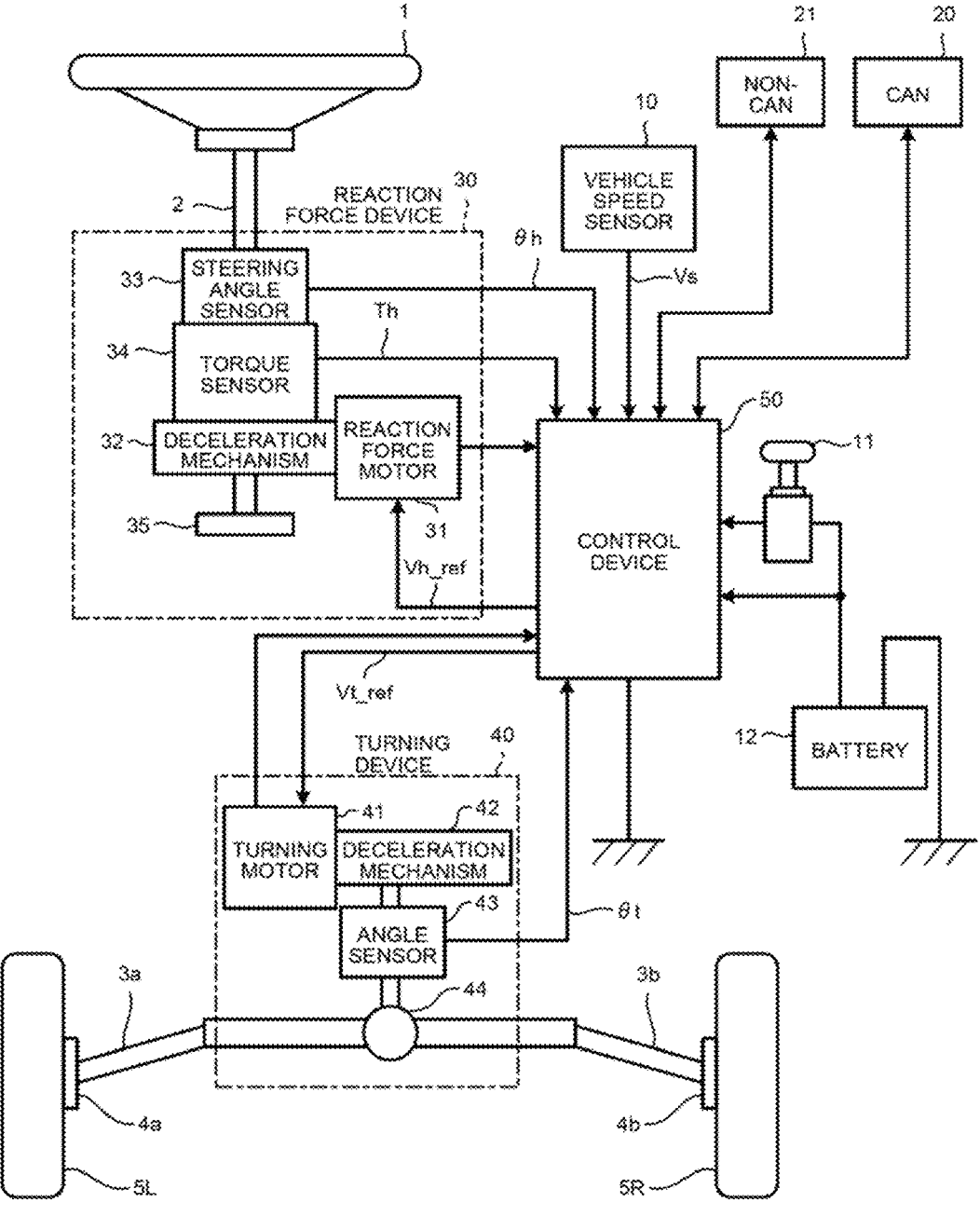
FIG. 1 is a configuration diagram illustrating an example of an outline of an SBW system including a control device according to the present disclosure.

FIG. 1 is a configuration diagram illustrating an example of an outline of an SBW system including a control device according to the present disclosure. The SBW system includes a reaction force device 30 constituting a steering mechanism having a steering wheel operated by a driver, a turning device 40 constituting a turning mechanism configured to turn a turning wheel, and a control device 50 configured to control both devices.

The SBW system does not include an intermediate shaft mechanically coupled to a column shaft (steering shaft, steering wheel shaft) 2 provided in a common electric power steering device, and transmits an operation of a steering wheel 1 by a driver as an electrical signal, specifically, a steering angle θh output from the reaction force device 30 as an electrical signal.

The reaction force device 30 includes a deceleration mechanism 32 that decelerates the rotational speeds of a reaction force motor 31. The reaction force device 30 transmits a motion state of a vehicle transmitted from turning wheels 5L and 5R to the driver as steering reaction force. The reaction force motor 31 applies the steering reaction force to the steering wheel 1 via the deceleration mechanism 32.

The reaction force device 30 further includes a steering angle sensor 33 and a torque sensor 34. The steering angle sensor 33 detects a steering angle θh of the steering wheel 1. The torque sensor 34 detects steering torque Th of the steering wheel 1. Hereinafter, the steering angle θh detected by the steering angle sensor 33 is also referred to as an "actual steering angle θh act", and the steering torque Th detected by the torque sensor 34 is also referred to as an "actual steering torque Th_act".

In the present disclosure, the column shaft 2 is provided with a stopper (a rotation restricting mechanism) 35 that physically sets a steering end that is a limit of a range in which steering can be performed. That is, the magnitude (absolute value) of the steering angle θh is limited by the stopper 35.

The turning device 40 includes a turning motor 41, a deceleration mechanism 42 that reduces the rotational speed of the turning motor 41, and a pinion rack mechanism 44 that converts rotational motion of the turning motor 41 into linear motion. The turning device 40 drives the turning motor 41 according to the steering angle θh, applies the driving force to the pinion rack mechanism 44 via the deceleration mechanism 42, and respectively turns the turning wheels 5L and 5R via tie rods 3a and 3b. An angle sensor 43 is disposed in the vicinity of the pinion rack mechanism 44 and detects a turning angle θt of the turning wheels 5L and 5R. Instead of the turning angle θt of the turning wheels 5L and 5R, for example, a motor angle of the turning motor 41, a position of a rack, or the like may be detected, and the detected value may be used. Hereinafter, the turning angle θt detected by the angle sensor 43 is also referred to as an "actual turning angle θt_act".

In order to cooperatively control the reaction force device 30 and the turning device 40, the control device 50 generates a voltage control command value Vh_ref for driving and controlling the reaction force motor 31 and a voltage control command value Vt_ref for driving and controlling the turning motor 41 based on a vehicle speed Vs and the like detected by a vehicle speed sensor 10 in addition to information such as the steering angle θh and the turning angle θt output from both devices.

Power is supplied from a battery 12 to the control device 50, and an ignition key signal is input to the control device 50 through an ignition key 11. Further, the control device 50 is connected to a controller area network (CAN) 20 for receiving and transmitting various kinds of information of a vehicle and can receives the vehicle speed Vs from the CAN 20. Furthermore, the control device 50 can also be connected to a non-CAN 21 that transmits and receives communication, analog/digital signals, radio waves, and the like other than the CAN 20.

Figure 2:
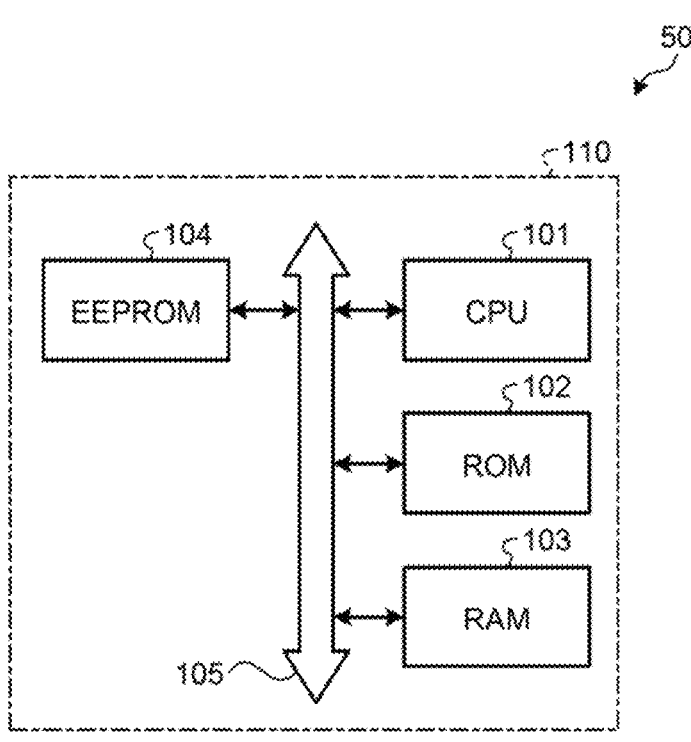
FIG. 2 is a schematic diagram illustrating a hardware configuration of an ECU.

Specifically, the control device 50 is, for example, an electronic controller (ECU) mounted in a vehicle. The ECU mainly includes a CPU (also includes MCU, MPU, and the like). FIG. 2 is a schematic diagram illustrating a hardware configuration of the ECU. As illustrated in FIG. 2, the control device 50 includes a control computer (electronic control unit, hereinafter also referred to as "ECU") 110.

The ECU 110 includes a central processing unit (CPU) 101, a read only memory (ROM) 102, a random access memory (RAM) 103, an electrically erasable programmable ROM (EEPROM) 104, and the like, which are connected to a bus 105. The CPU 101 executes a control program stored in the ROM 102. The reaction force device 30 and the turning device 40 are cooperatively controlled mainly by the control program executed by the ECU 110. The control device 50 may be composed of one ECU or may have a configuration including a reaction force control ECU that controls the reaction force device 30 and a turning control ECU that controls the turning device 40.

The ROM 102 is used as a memory for storing a control program and control data used when the control program is executed. The RAM 103 is used as a work memory for operating the control program.

The EEPROM 104 is a non-volatile memory capable of storing stored contents even after power is shut off, and stores control data and the like used by the CPU 101 to execute the control program. Various kinds of data stored in the EEPROM 104 are used on the control program loaded in the RAM 103 after the ECU 110 is powered on, and are overwritten in the EEPROM 104 at a predetermined timing. Here, the EEPROM is used as the non-volatile memory, but the present invention is not limited thereto, and other non-volatile memories such as a FLASH-ROM (registered trademark) and an SDRAM may be used.

Figure 3:
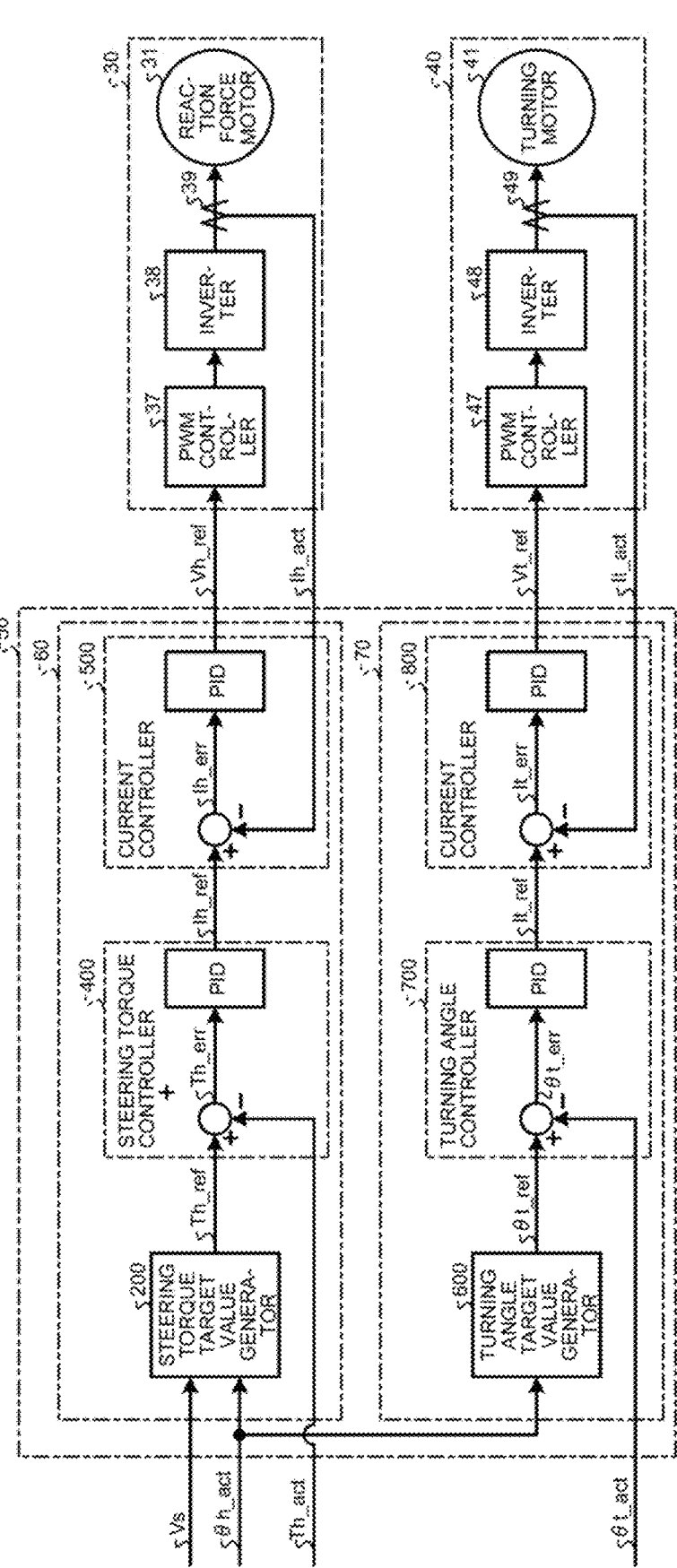
FIG. 3 is a diagram illustrating an example of a basic control block configuration of the control device of the SBW system.

FIG. 3 is a diagram illustrating an example of a basic control block configuration of the control device of the SBW system. In FIG. 3, the reaction force device 30 includes a pulse width modulation (PWM) controller 37, an inverter 38, and a motor current detector 39 in addition to the reaction force motor 31 and the above-described configuration. Further, the turning device 40 includes a PWM controller 47, an inverter 48, and a motor current detector 49 in addition to the turning motor 41 and the above-described configuration. The control device 50 serves as each control block of a reaction force control system 60 that controls the reaction force device 30 and a turning control system 70 that controls the turning device 40. The reaction force control system 60 and the turning control system 70 cooperate to control the reaction force device 30 and the turning device 40. When the control device 50 includes the reaction force control ECU and the turning control ECU, the reaction force control ECU may serve as the reaction force control system 60, and the turning control ECU may serve as the turning control system 70. In this case, the reaction force control system 60 in the following description may be replaced with the reaction force control ECU, and the turning control system 70 may be replaced with the turning control ECU.

Each control block of the reaction force control system 60 is provided by a reaction force control program executed in the ECU 110. In addition, each control block of the turning control system 70 is provided by a turning control program executed in the ECU 110. Some or all of the control blocks of the control device 50 may be provided by hardware. The control device 50 may include the PWM controller 37, the inverter 38, the motor current detector 39, the PWM controller 47, the inverter 48, and the motor current detector 49.

As illustrated in FIG. 3, the control device 50 includes, as each control block, a steering torque target value generator 200, a road surface reaction force adaptive torque compensation value generator 220, a steering torque controller 400, a current controller 500, a turning angle target value generator 600, a turning angle controller 700, and a current controller 800. The steering torque target value generator 200, the road surface reaction force adaptive torque compensation value generator 220, the steering torque controller 400, and the current controller 500 are control blocks constituting the reaction force control system 60. The turning angle target value generator 600, the turning angle controller 700, and the current controller 800 are control blocks constituting the turning control system 70.

The reaction force control system 60 performs control such that the actual steering torque Th_act detected by the torque sensor 34 follows a steering torque target value Th_ref that is a target value of the steering torque of the reaction force device 30.

The steering torque target value generator 200 generates the steering torque target value Th_ref.

The steering torque controller 400 generates a reaction force motor current command value Ih_ref that is a control target value of the current to be supplied to the reaction force motor 31. The steering torque controller 400 generates a current command value to make a deviation Th_err between the steering torque target value Th_ref and the actual steering torque Th_act closer to 0, and limits the output of the current command value within a range having upper and lower limit values of the current command value by an output limitation controller, and thereby calculating the reaction force motor current command value Ih_ref.

The current controller 500 performs current control of the reaction force motor 31. The current controller 500 calculates a voltage control command value Vh_ref to make a deviation Ih_err between the reaction force motor current command value Ih_ref output from the steering torque controller 400 and an actual current value (a motor current value) Ih_act of the reaction force motor 31 detected by the motor current detector 39 closer to 0.

In the reaction force device 30, the reaction force motor 31 is driven and controlled via the PWM controller 37 and the inverter 38 based on the voltage control command value Vh_ref.

The turning control system 70 performs control such that the actual turning angle θt_act detected by the angle sensor 43 follows a turning angle target value θt_ref.

The turning angle target value generator 600 generates the turning angle target value θt_ref based on the steering angle θh.

Figure 4:
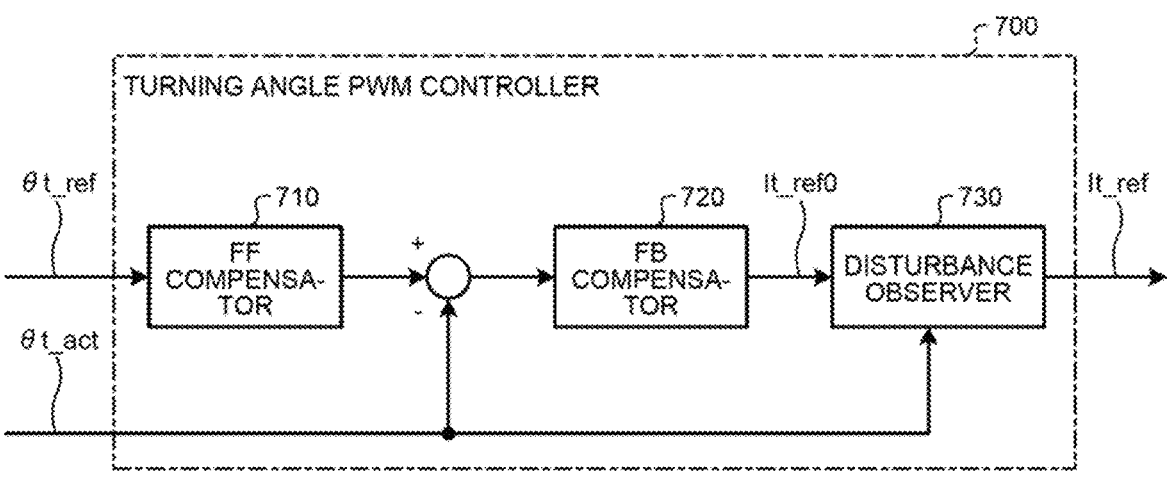
FIG. 4 is a block diagram illustrating a configuration example of a turning angle controller according to the embodiment.

The turning angle controller 700 generates a turning motor current command value It_ref that is a control target value of the current to be supplied to the turning motor 41. The turning angle controller 700 calculates the turning motor current command value It_ref to make a deviation θt_err between the turning angle target value θt_ref and the actual turning angle θt_act closer to 0. A more specific configuration example of the turning angle controller according to the embodiment will be described later with reference to FIG. 4. In FIG. 3, a part of the specific configuration illustrated in FIG. 4 is omitted.

The current controller 800 performs current control of the turning motor 41. The current controller 800 calculates a voltage control command value Vt_ref to make a deviation It_err between the turning motor current command value It_ref output from the turning angle controller 700 and an actual current value (a motor current value) It_act of the turning motor 41 detected by the motor current detector 49 closer to 0.

In the turning device 40, driving of the turning motor 41 is controlled via the PWM controller 47 and the inverter 48 based on the voltage control command value Vt_ref.

In the present embodiment, each of the steering torque controller 400, the current controller 500, the turning angle target value generator 600, the turning angle controller 700, and the current controller 800 only needs to have a configuration capable of implementing each control in the reaction force control system 60 or the turning control system 70, and is not limited by the configuration of each control block. Hereinafter, a specific configuration of the turning angle controller 700 according to the present embodiment will be described with reference to FIG. 4.

FIG. 4 is a block diagram illustrating a configuration example of the turning angle controller according to the embodiment. As illustrated in FIG. 4, the turning angle controller 700 according to the present embodiment includes a feedforward (FF) compensator 710, a feedback (FB) compensator 720, and a disturbance observer 730 as main components.

The feedforward compensator 710 includes a filter (FF filter) for improving the followability of the actual turning angle θt_act relative to the turning angle target value θt_ref. The feedforward compensator 710 performs filtering on the turning angle target value θt_ref. The feedback compensator 720 is formed by, for example, a PID controller that performs PID control to make the deviation θt_err between the turning angle target value θt_ref and the actual turning angle θt_act closer to 0. The feedback compensator 720 is not limited to the PID controller, and may be formed by, for example, a PD controller.

The disturbance observer 730 estimates a disturbance component acting on a control target (Plant) of the turning angle controller 700 and removes the disturbance component from an output value of the feedback compensator 720. The "Plant" illustrated in FIG. 5 is an inertial system including the turning device 40.

Figure 5:
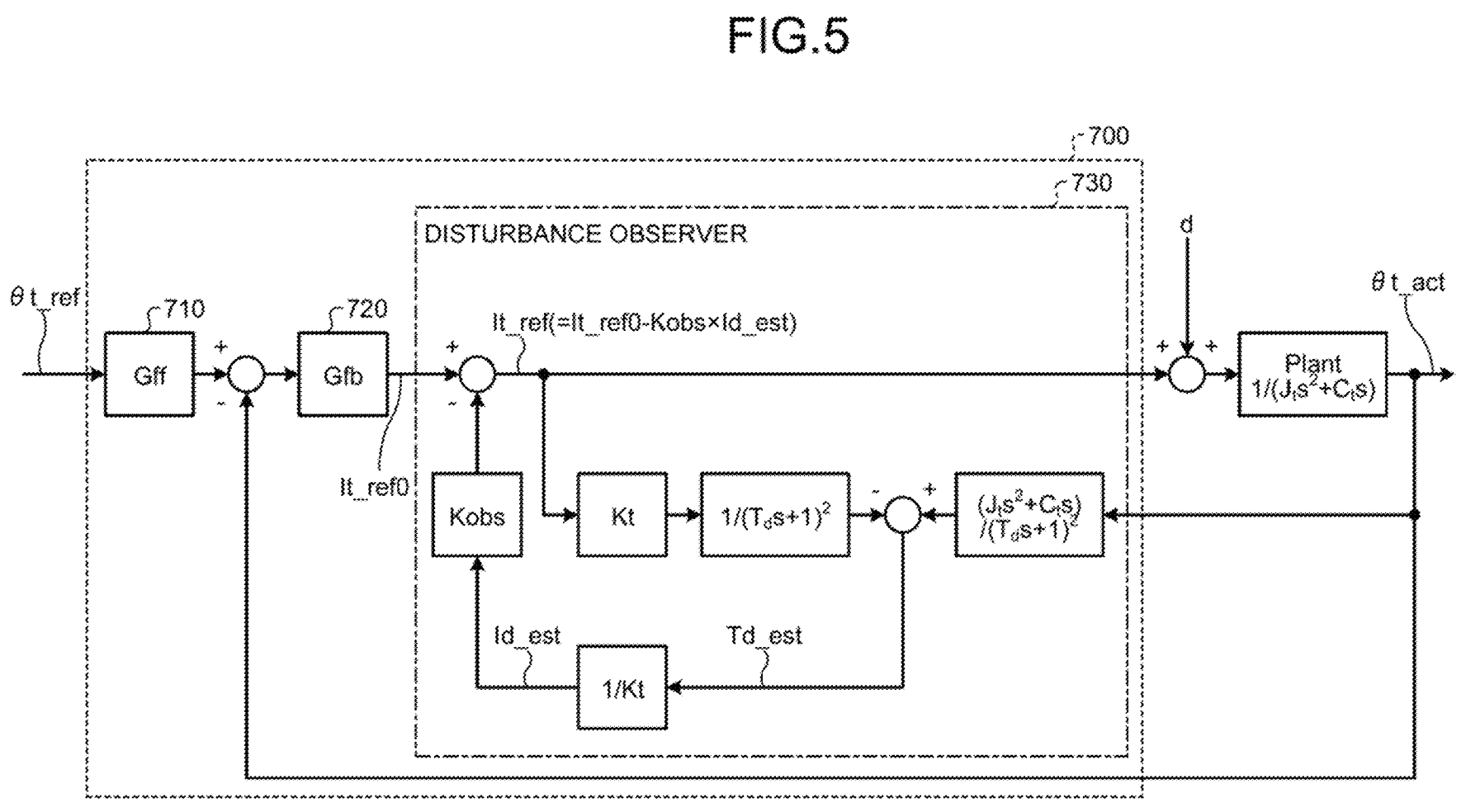

FIG. 5 is a diagram illustrating an example of a block diagram including the turning angle controller and the control target. A plant model that is a plant transmission characteristic is expressed by the following expression (1). In the following expression (1), $J_t$ represents an inertia coefficient of the Plant, and $C_t$ represents a viscosity coefficient of the Plant.

$$1/(J_t s^2 + C_t s) \tag{1}$$

The disturbance observer 730 includes a second-order low pass filter (LPF). The transmission characteristic of the LPF is expressed by the following expression (2).

$$1/(T_d s + 1)^2 \qquad (2)$$

In the LPF having the transmission characteristic expressed by the expression (2), a disturbance compensation band in the disturbance observer 730 can be adjusted. Specifically, the disturbance compensation band can be widened to the high frequency side by increasing a cutoff frequency.

In the example illustrated in FIG. 5, the disturbance observer 730 generates an inverse model of the Plant $(J_t s^2 + C_t s)/(T_d s+1)^2$ by applying the LPF having the transmission characteristic expressed by the expression (2) to an inverse characteristic $J_t s^2 + C_t s$ of the plant model expressed by the expression (1). The disturbance observer 730 converts the output value into torque by multiplying the output value by a coefficient Kt. The disturbance observer 730 subtracts a value obtained by applying the LPF of the transmission characteristic expressed by the expression (2) to the converted torque from a value obtained by multiplying the actual turning angle θt_act by the inverse model of the Plant, thereby calculating a torque estimation value Td_est of the disturbance component. Then, the disturbance observer 730 converts the torque estimation value into current by dividing the disturbance torque estimation value Td_est by the coefficient Kt to calculate a current estimation value Id_est of the disturbance component, multiplies the current estimation value Id_est by a compensation gain Kobs, and then removes the multiplied value (Kobs×Id_est) from an output value It_ref0 of the feedback compensator 720 to obtain a value It_ref0-Kobs×Id_est. The disturbance observer 730 outputs the value It_ref0-Kobs×Id_est as the turning motor current command value It_ref. The compensation gain Kobs is set to a value of 0 or more and not more than 1. The order of the LPF is not limited to the second order and may be a second or higher order LPF having a predetermined high frequency attenuation characteristic. Setting the LPF to have second or higher order transmission characteristic optimizes components in the disturbance compensation band of the inverse model of the Plant.

Figure 6:
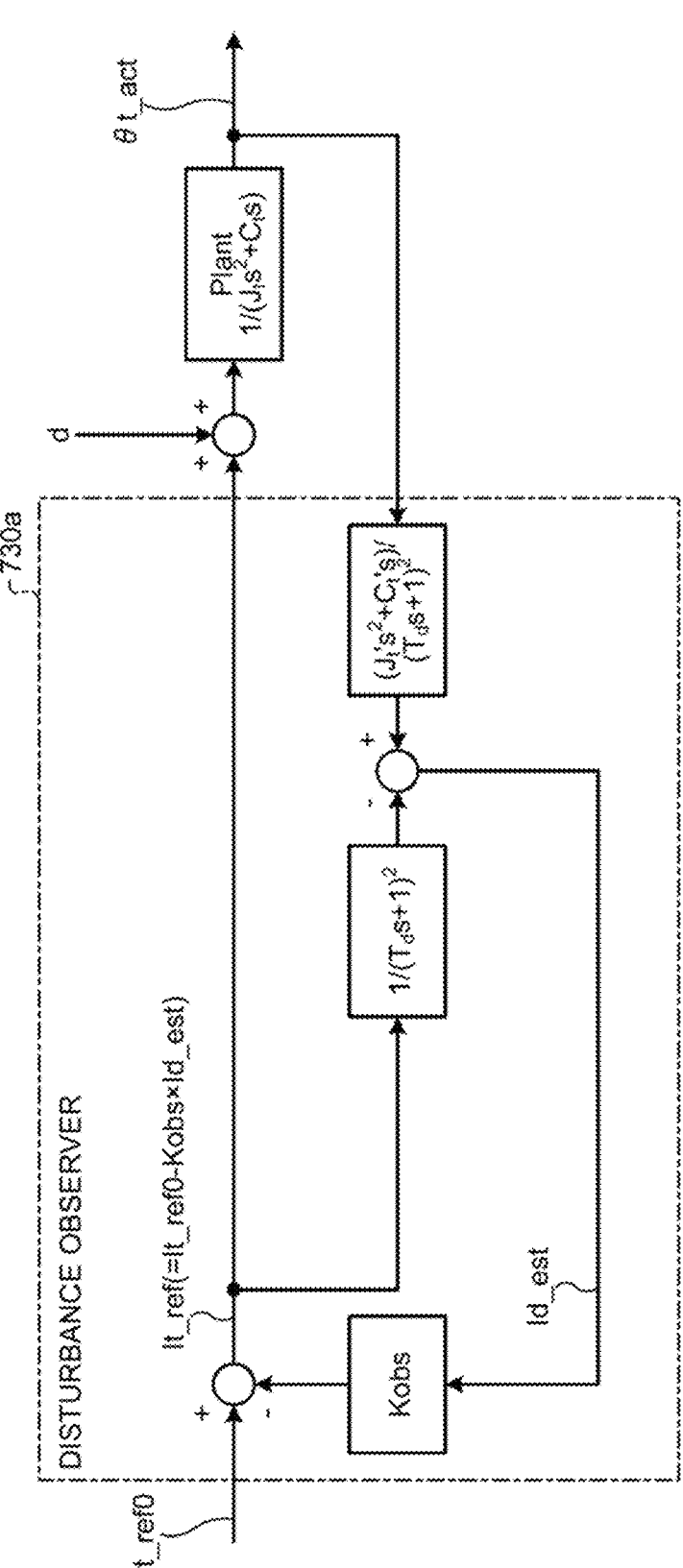
FIG. 6 is a block diagram illustrating a modification of a disturbance observer.

FIG. 6 is a block diagram illustrating a modification of the disturbance observer. In the modification illustrated in FIG. 6, $J_t'$ and $C_t'$ can be expressed by the following equations (3) and (4), respectively.

$$J_t' = J_t/Kt \qquad (3)$$

$$C_t' = C_t/Kt \qquad (4)$$

A disturbance observer 730a converts the inverse characteristic $J_t s^2 + C_t s$ of the plant model expressed by the expression (1) to current using the equations (3) and (4), and further applies the LPF having the transmission characteristic expressed by the expression (2) thereto, thereby generating an inverse model of the Plant $(J_t s^2 + C_t s)/(T_d s+1)^2$. The disturbance observer 730a calculates the current estimation value Id_est of the disturbance component by subtracting a value obtained by applying the LPF of the transmission characteristic expressed by the expression (2) to the output value from a value obtained by multiplying the actual turning angle θt_act by the inverse model of plant, multiplies the current estimation value Id_est by the compensation gain Kobs, and removes the multiplied value (Kobs×Id_est) from the output value It_ref of the feedback compensator 720 to obtain a value It_ref0-Kobs×Id_est. The disturbance observer 730a outputs the value It_ref0-Kobs×Id_est as the turning motor current command value It_ref.

The disturbance observers 730 and 730a described above can remove a disturbance component d acting on the Plant. The configurations of the disturbance observers 730 and 730a illustrated in FIGS. 5 and 6 are each an example, and the present invention is not limited thereto.

Figure 7:
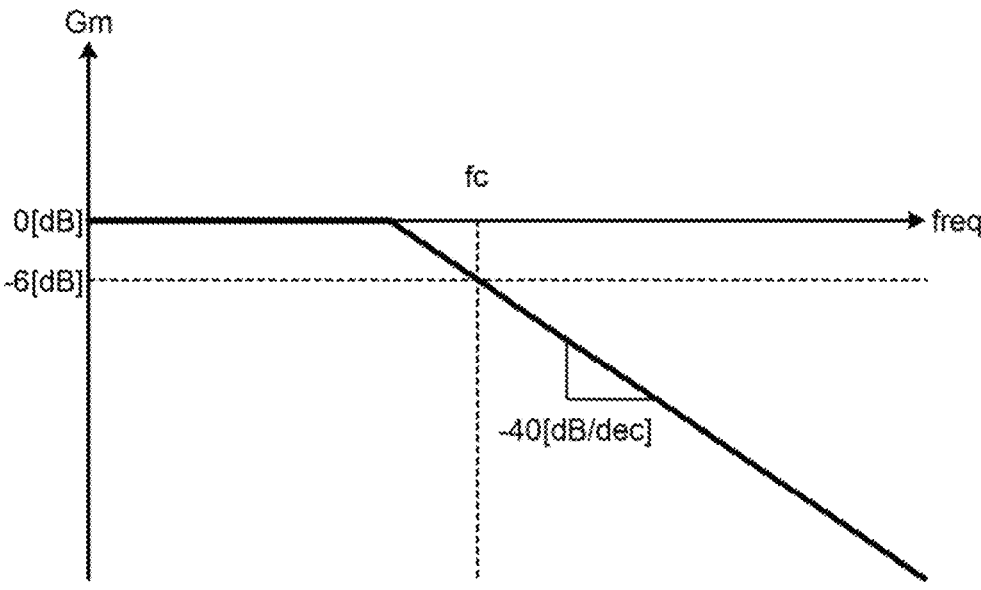
FIG. 7 is a Bode diagram illustrating an example of a target transmission characteristic provided in the turning angle controller.

FIG. 7 is a Bode diagram illustrating an example of the target transmission characteristic provided by the turning angle controller. FIG. 7 illustrates a second-order LPF characteristic as an example of the target transmission characteristic Gm that is a target value of the transmission characteristic of the control system that receives the turning angle target value θt_ref and outputs the actual turning angle θt_act. A cutoff frequency fc in the target transmission characteristic Gm is, for example, about 5 (Hz) to 15 (Hz).

Figure 8:
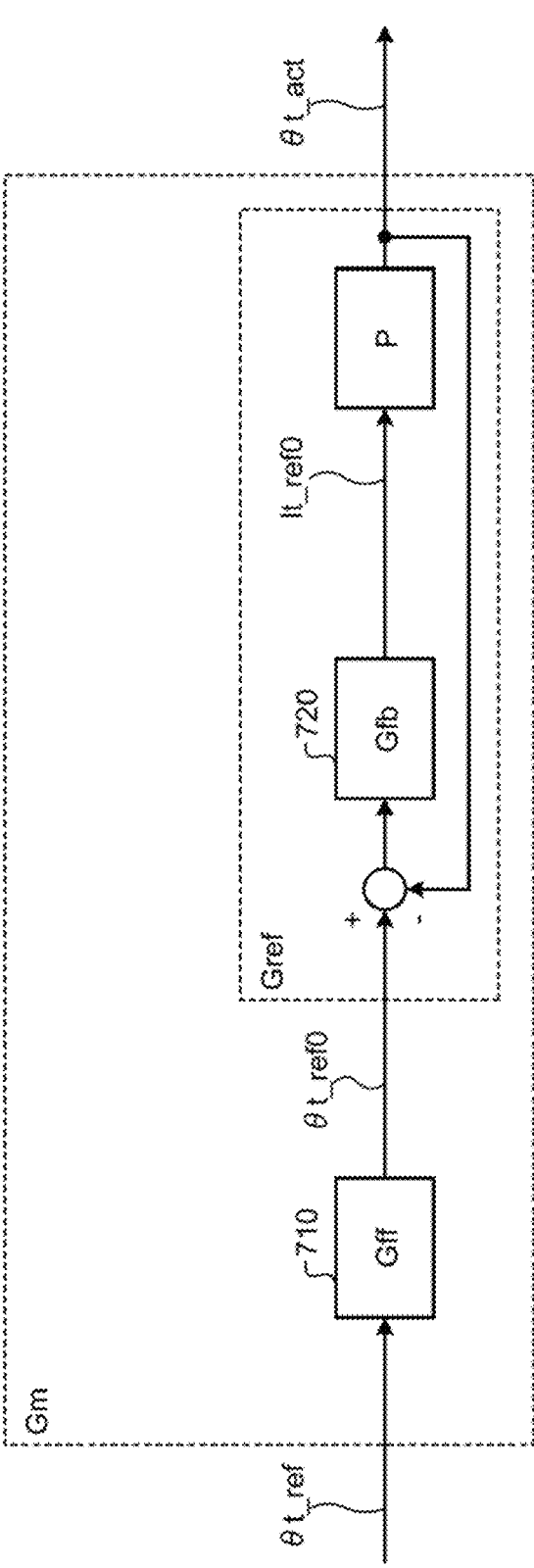

FIG. 8 is a diagram illustrating an example of a block diagram in which FIG. 5 is simplified. In the following description, Gff denotes the transmission characteristic of the feedforward compensator 710, Gfb denotes the transmission characteristic of the feedback compensator 720, Gref denotes the transmission characteristic of the control system that receives the output value θt_ref0 of the feedforward compensator 710 and outputs the actual turning angle θt_act, and P denotes the transmission characteristic of the control system that receives the output value It_ref0 of the feedback compensator 720 and outputs the actual turning angle θt_act. The transmission characteristic Gref and the transmission characteristic P can be derived by simulation.

The transmission characteristic Gff of the feedforward compensator 710 can be expressed by the following equation (5) represented by the target transmission characteristic Gm and the transmission characteristic Gref that can be derived by simulation.

$$Gff = Gm/Gref \qquad (5)$$

On the other hand, when Gref' denotes the transmission characteristic of the control system that receives the turning angle target value θt_ref and outputs the actual turning angle θt_act, the transmission characteristic Gref' is equivalent to the target transmission characteristic Gm, as expressed by the following equation (6).

$$Gref' = Gff \times Gref = (Gm/Gref) \times Gref = Gm \qquad (6)$$

That is, in the block diagram illustrated in FIG. 8, the feedforward compensator 710 outputs the value θt_ref0 obtained by applying the transmission characteristic expressed by the equation (5) to the turning angle target value θt_ref, and the feedback compensator 720 performs control based on the deviation θt_err between the output value θt_ref0 of the feedforward compensator 710 and the actual turning angle θt_act.

In the mode illustrated in FIG. 8 and the equation (5), the transmission characteristic of the feedforward compensator 710 can be set using the target transmission characteristic Gm to be provided by the turning angle controller 700 and the transmission characteristic Gref that can be derived by simulation. As a result, followability to the target transmission characteristic Gm provided by the turning angle controller 700 can be improved.

In addition, the transmission characteristic Gref can be expressed by the following equation (7).

$$Gref = Gfb \times P/(1 + Gfb \times P) \qquad (7)$$

When the (7) is applied to the equation (5), the following equation (8) is obtained.

$$Gff = Gm(1 + Gfb)/Gfb \times P = Gm/Gfb \times P + Gm \qquad (8)$$

Figure 9:
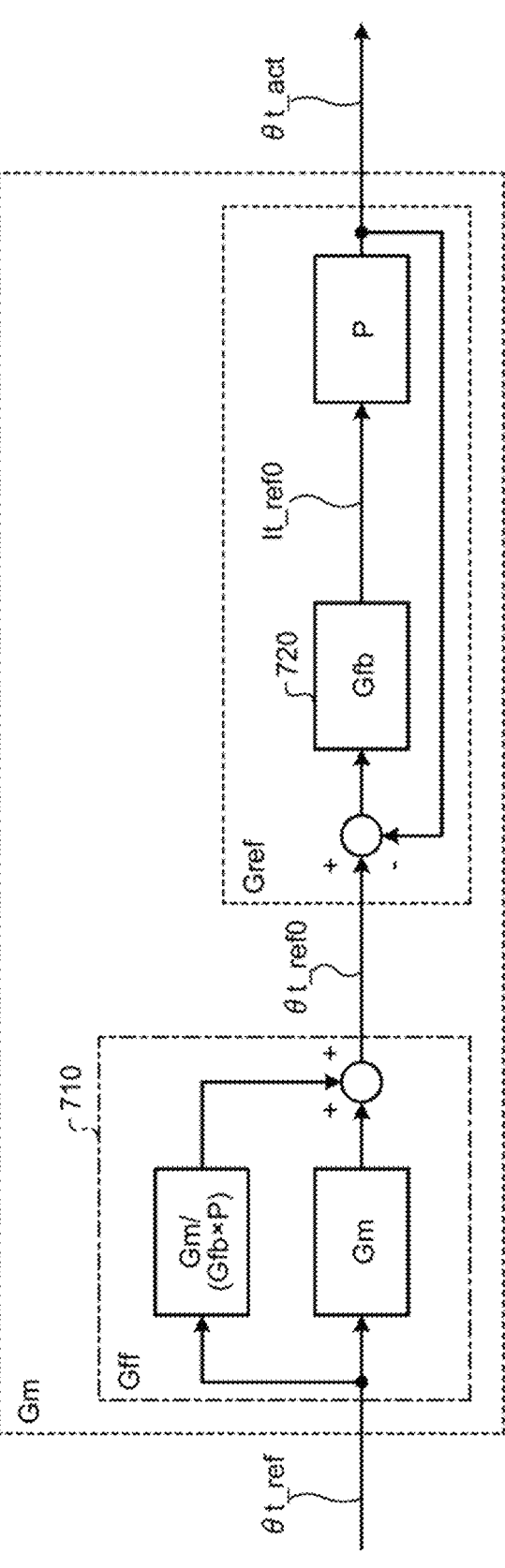
FIG. 9 is a diagram illustrating a modification of the block diagram illustrated in FIG. 8.

Therefore, the block diagram illustrated in FIG. 8 can be illustrated in FIG. 9. FIG. 9 is a diagram illustrating a modification of the block diagram illustrated in FIG. 8.

Figure 10:
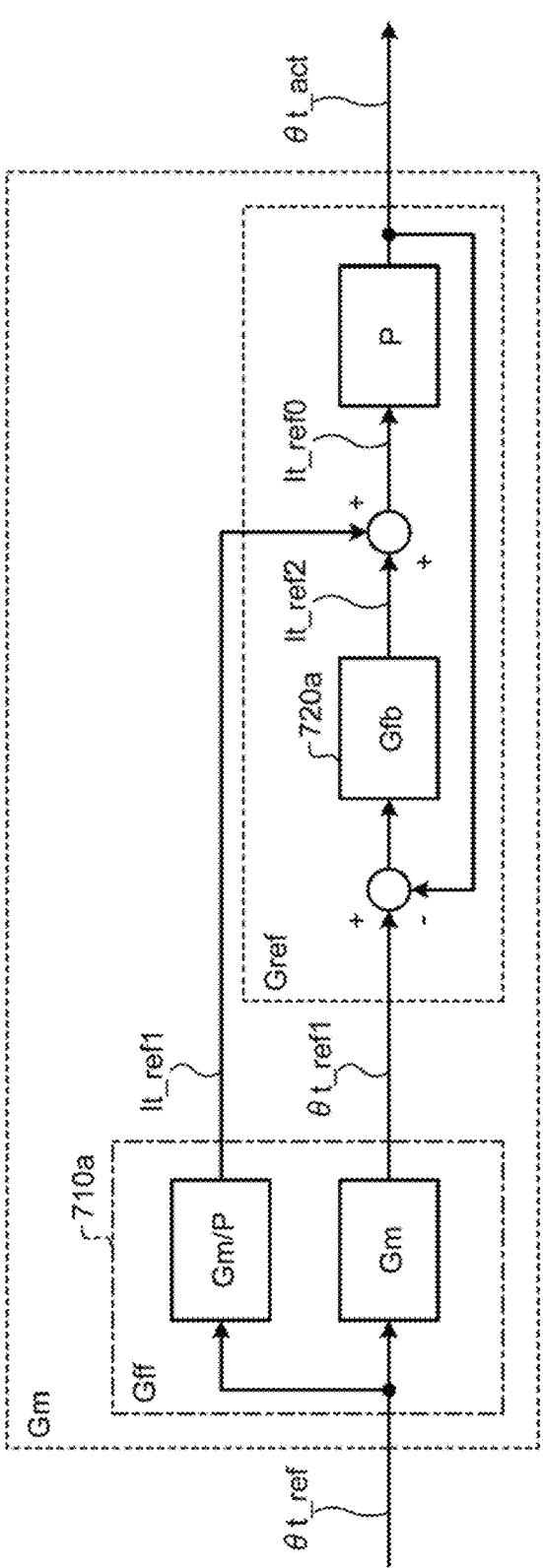
FIG. 10 is a diagram illustrating a modification of the block diagram illustrated in FIG. 9.

In the block diagram illustrated in FIG. 9, the transmission characteristic Gfb of the feedback compensator 720 is included in the transmission characteristic of the feedforward compensator 710. Here, the block diagram illustrated in FIG. 9 can be modified to be illustrated in FIG. 10. FIG. 10 is a diagram illustrating a modification of the block diagram illustrated in FIG. 9.

In the modification illustrated in FIG. 10, the input/output characteristics of the control system that inputs the turning angle target value $\theta t\_ref$ and outputs the output value $It\_ref0$ of the feedback compensator 720 can be expressed by the following equations (9) to (13).

$$It\_ref0 = It\_ref1 + It\_ref2 \qquad (9)$$

$$It\_ref1 = (Gm/P) \times \theta t\_ref \qquad (10)$$

$$It\_ref2 = Gfb \times (\theta t\_ref1 - \theta t\_act) \qquad (11)$$

$$\theta t\_ref1 = Gm \times \theta t\_ref \qquad (12)$$

$$It\_ref0 = (Gm/P) \times \theta t\_ref + Gfb \times (Gm \times \theta t\_ref - \theta t\_act) \qquad (13)$$

That is, in the modification illustrated in FIG. 10, a feedforward compensator 710a outputs a value $\theta t\_ref1$ (a first value) obtained by applying the target transmission characteristic Gm to the turning angle target value $\theta t\_ref$, and a feedback compensator 720a performs control based on a deviation $\theta t\_err$ between the output value $\theta t\_ref1$ (the first value) of the feedforward compensator 710a and the actual turning angle $\theta t\_act$. Furthermore, the feedforward compensator 710a outputs a value $It\_ref1$ (a second value) obtained by applying a transmission characteristic Gm/P to the turning angle target value $\theta t\_ref$, and the disturbance observer 730 (730a) performs control based on a value $It\_ref0$ obtained by adding the output value $It\_ref1$ (the second value) of the feedforward compensator 710a to an output value $It\_ref2$ of the feedback compensator 720a.

In the mode illustrated in FIG. 10 and the equations (9) to (13), the transmission characteristic of the feedforward compensator 710a can be set using the target transmission characteristic Gm to be provided by the turning angle controller 700 and the transmission characteristic P that can be derived by simulation. As a result, followability to the target transmission characteristic Gm provided by the turning angle controller 700 can be improved.

The drawings used in the above-described embodiment are conceptual diagrams for describing the present disclosure in a qualitative manner, and are not limited thereto. In addition, the above-described embodiment is a preferred embodiment of the present disclosure, but is not limited thereto, and various modifications can be made without departing from the gist of the present disclosure.

The invention claimed is:

1. A control device of a vehicle steering system comprising a turning motor that turns a turning wheel in accordance with a steering angle of a steering wheel, the control device comprising:

a turning angle controller configured to generate, based on a turning angle target value serving as a target value of a turning angle of the turning wheel, a motor current command value serving as a control target value of current to be supplied to the turning motor, wherein the turning angle controller includes:

a feedforward compensator configured to improve followability of the turning angle with respect to the turning angle target value;

a feedback compensator configured to control the motor current command value based on a deviation between an output value of the feedforward compensator and an actual turning angle serving as an actual turning angle of the turning wheel; and a disturbance observer configured to estimate a disturbance component acting on an inertial system including the turning motor and to remove the disturbance component from the motor current command value.

2. The control device according to claim 1, wherein when Gm denotes a target transmission characteristic of a control system that receives the turning angle target value and outputs the actual turning angle, and Gref denotes a transmission characteristic of a control system that receives the output value of the feedforward compensator and outputs the actual turning angle, the feedforward compensator is configured to output a value obtained by applying a transmission characteristic Gm/Gref to the turning angle target value.

3. The control device according to claim 1, wherein when Gm denotes a target transmission characteristic of a control system that receives the turning angle target value and outputs the actual turning angle, Gref denotes a transmission characteristic of a control system that receives the output value of the feedforward compensator and outputs the actual turning angle, and P denotes a transmission characteristic of a control system that receives an output value of the feedback compensator and outputs the actual turning angle, the feedforward compensator is configured to output a first value obtained by applying the target transmission characteristic Gm to the turning angle target value and output a second value obtained by applying a transmission characteristic Gm/P to the turning angle target value, the feedback compensator is configured to control the motor current command value based on a deviation between the first value and the actual turning angle, and the disturbance observer is configured to control the motor current command value based on a value obtained by adding the second value to the output value of the feedback compensator.

4. The control device according to claim 1, wherein the disturbance observer is configured to:

include a filter having a predetermined high frequency attenuation characteristic;

generate an inverse model of the inertial system by applying the filter to an inverse characteristic of a plant model serving as a transmission characteristic of the inertial system;

calculate a torque estimation value of the disturbance component by subtracting a value obtained by converting an output value of the disturbance observer into torque and further applying the filter from a value obtained by multiplying the actual turning angle by the inverse model;

calculate a current estimation value of the disturbance component by converting the torque estimation value into current; and remove a value obtained by multiplying the current estimation value by a compensation gain from the output value of the feedback compensator, and output a result value as the motor current command value.

5. The control device according to claim 1, wherein the disturbance observer is configured to:

include a filter having a predetermined high frequency attenuation characteristic;

generate an inverse model of a plant model serving as a transmission characteristic of the inertial system;

calculate a torque estimation value of the disturbance component by subtracting a value obtained by converting an output value of the disturbance observer into torque from a value obtained by multiplying the actual turning angle by the inverse model and further applying the filter;

calculate a current estimation value of the disturbance component by converting the torque estimation value into current; and remove a value obtained by multiplying the current estimation value by a compensation gain from the output value of the feedback compensator, and output a result value as the motor current command value.

6. The control device according to claim 1, wherein the disturbance observer is configured to:

include a filter having a predetermined high frequency attenuation characteristic;

generate an inverse model of the inertial system by converting an inverse characteristic of a plant model serving as a transmission characteristic of the inertial system into current and further applying the filter;

calculate a current estimation value of the disturbance component by subtracting a value obtained by applying the filter to an output value of the disturbance observer from a value obtained by multiplying the actual turning angle by the inverse model; and remove a value obtained by multiplying the current estimation value by a compensation gain from the output value of the feedback compensator, and output a result value as the motor current command value.

7. The control device according to claim 1, wherein the disturbance observer is configured to:

include a filter having a predetermined high frequency attenuation characteristic;

generate an inverse model of the inertial system by converting an inverse characteristic of a plant model serving as a transmission characteristic of the inertial system into current;

calculate a current estimation value of the disturbance component by subtracting an output value of the disturbance observer from a value obtained by multiplying the actual turning angle by the inverse model and further applying the filter; and remove a value obtained by multiplying the current estimation value by a compensation gain from the output value of the feedback compensator, and output a result value as the motor current command value.

8. The control device according to claim 1, wherein the feedback compensator is formed of a PID controller.

9. The control device according to claim 1, wherein the feedback compensator is formed of a PD controller.

* * * * *